United States Patent
May

Patent Number: 6,148,559
Date of Patent: Nov. 21, 2000

[54] FRUIT TREE BUDDING CONTROL METHOD AND APPARATUS

[75] Inventor: Monte Dale May, Odessa, Tex.

[73] Assignee: May Business Trust, Humboldt, Tenn.

[21] Appl. No.: 09/150,158

[22] Filed: Sep. 9, 1998

Related U.S. Application Data

[60] Provisional application No. 60/062,586, Oct. 20, 1997.

[51] Int. Cl.⁷ ............................. A01C 1/00; A01G 1/00; A01G 13/00; A01G 23/10; A01B 79/00
[52] U.S. Cl. ............................. 47/1.01 F; 47/2; 47/58.1; 47/50
[58] Field of Search ................... 47/1.01 F, 48.5, 47/2, 50–54; 73/204.22, 204.24, 204.16, 861, 861.95; 219/535, 528, 549; 62/260, 235; 165/45

[56] References Cited

U.S. PATENT DOCUMENTS

| | | | |
|---|---|---|---|
| 42,176 | 4/1864 | Fisher | 47/58.1 |
| 1,027,403 | 5/1912 | Darling | 310/81 |
| 1,442,367 | 1/1923 | Stevens | 47/1.01 R |
| 1,967,803 | 7/1934 | Boland | 61/13 |
| 2,122,734 | 7/1938 | Winford | 47/24 |
| 2,341,867 | 2/1944 | Hitchcock et al. | 47/53 |
| 3,060,637 | 10/1962 | Fumeaux | 47/1 |
| 3,518,831 | 7/1970 | Tibbals, Jr. et al. | 61/13 |
| 3,521,699 | 7/1970 | Van Huisen | 165/1 |
| 3,890,740 | 6/1975 | Miller | 47/58 |
| 4,348,135 | 9/1982 | St. Clair | 405/36 |
| 4,385,500 | 5/1983 | Kjelgaard et al. | 62/51 |
| 4,577,435 | 3/1986 | Springer et al. | 47/2 |
| 5,177,897 | 1/1993 | Patterson | 47/48.5 |
| 5,368,092 | 11/1994 | Rearden et al. | 165/45 |

FOREIGN PATENT DOCUMENTS 2 549 692 A1   7/1983   France .................... 47/1.01

*Primary Examiner*—Peter M. Poon
*Assistant Examiner*—Fredrick T. French, III
*Attorney, Agent, or Firm*—Christopher Whewell

[57] ABSTRACT

Disclosed herein is a system and method for saving crops by preventing premature bud formation on various agriculturally-valuable flora. The method consists in maintaining the temperature of an effective amount of the roots of a plant below that temperature at which bud formation normally ensues. The system and method is especially well suited for unusual warm spells which occur during seasonal changes and for staggering crop portions in order to effectively manage the harvest.

17 Claims, 2 Drawing Sheets

FRUIT TREE BUDDING CONTROL METHOD AND APPARATUS

This application claims the benefit of U.S. Provisional Application No. 60/062,586 filed Oct. 20, 1997, the entire contents of which is herein incorporated by reference.

BACKGROUND

The present invention relates generally to controlling the time at which various fruit-bearing trees and other plants bear their buds for pollination, and is more specifically related to the control of root temperature as a means for achieving controlled budding in various species.

Since the beginnings of agriculture, premature bud formation due to unseasonable warm spells either during winter itself or during the transition from winter to spring has been a problem. Warm spells are periods of time during which the outside temperature typically rises above freezing and remains warm just long enough to cause a fruit-bearing tree (such as but not limited to apple, cherry, plum, pear, etc.) to produce buds for pollination. After such warm spells, ambient temperatures return to the normal seasonal temperatures which are below freezing. A large proportion of the buds which formed or opened during the warm spell are commonly damaged or destroyed by the effect of the normal seasonal temperature, which is that of frosting or freezing. The financial and food value of crops lost to these effects is staggering. In a given year, it is not uncommon for between about 20% and 80% of potential fruit to be lost to variations in weather around the time of budding. The associated losses amount to tens of millions of dollars annually.

The opening of buds may be a result of different conditions for different species. In some species the opening of buds may be influenced by photosynthesis, that is to say, the amount of sunlight impingent upon the flora, irrespective of the ambient temperature. In other species, (e.g., apples) the opening of buds may be influenced predominantly by 5 root temperature. That is, the formation and opening of the buds is inhibited so long as the root temperature is maintained below a critical level (which may vary from species to species). This invention relates to the precise control of the formation and opening of buds on those species which are influenced most by root temperature.

Numerous techniques have been attempted, suggested, and devised for preventing premature bud formation to provide trees and other fruit bearing flora with a method of protection against the phenomenon often referred to by those of ordinary skill in this art as "kill-back", most of which techniques are prohibitively costly and labor-intensive to the farm, orchard, or field operator. It has been long recognized that temporary warm spells in the winter or transition season will arouse a tree from its dormancy and cause sap to flow through the tree's system and are thus conducive to premature bud formation which renders the tree highly susceptible to kill-back upon resumption of normally cold weather. As a result of this problem, many attempts have been made to protect trees and the like from premature bud formation. Some of the prior art methods to protect trees from premature bud formation have included:

1) Covering fruit trees with a foam or fog to minimize radiation heat losses from the tree or surrounding soil;
2) spraying water on trees during freezing temperatures;
3) heating orchards by burning tires, oil, or other combustible materials in open pots or the like;
4) maintaining the tree in a chilled condition by packing "dry ice" around the tree during temporary warm spells of winter so that the tree will not be influenced by the temporary warm weather; and
5) maintenance of the tree in a chilled condition by a refrigerating system in which coolant is circulated through a coil of many turns around the base of the tree during temporary warm spells to promote the tree's dormancy.

Examples of these types of measures may be found in U.S. Pat. Nos. 1,027,403; 1,442,367; 2,122,734; 2,341,867; 3,060,637; 3,521,699; 3,890,740; 4,385,500; and 4,577,435, the entire contents of which are herein incorporated by reference.

Thus, although several attempts have been made at solving the problem of premature bud formation on fruit-bearing trees and other agriculturally-valuable flora, it is evident from news stories and statistics published by the US Department of Agriculture that the degree of success met by the various methods is much less than desirable, as tons of crops remain to be lost each season to the effects of undesirable weather variation. Therefore, it would be desirable to have a system at hand which possesses a high degree of effectiveness at retarding the formation of buds on fruit-bearing trees and other agricultrually-valuable flora at the will of the operator. It would also be desirable to have at hand such a system in which is effective over a sufficient range of outside temperatures to provide substantial versatility in the use of the system. It would also be desirable to have at hand such a system in which does not possess selective operability from one species of flora to the next but is equally effective on all species. It would also be desirable to have available a system which is simple to operate to the degree that an ordinary farmer or field operator is capable of effectively using the system with a minimal amount of training. Finally, it would also be desirable to have at hand such a system which is available at a cost which is economical enough to enable even the most budget limited farmer to reap the benefits of the system. By his craft, the inventor hereof has provided such a system.

SUMMARY OF THE INVENTION

The present invention relates to a system for preventing premature formation of buds on agriculturally valuable flora during unexpected warm spells occurring in the winter, and during the winter-to-summer transition. The system is also valuable for assisting in the harvest of crops insomuch as it permits the field operator to stagger the ripening of selected areas of the fields tended. The invention also relates to a method for operating such systems.

In accordance with fulfillment of the foregoing desirable features of a system useful in controlling the budding of agriculturally-valuable flora, the instant invention comprises a subterranean closed-loop conduit having a high pressure region and a low pressure region containing distribution lines, wherein the conduit contains a coolant which is preferably gaseous under conditions of standard temperature and pressure.

In one embodiment of the invention, the coolant is a gas having an inversion temperature that is greater than 50 degrees centigrade. The coolant gas may be selected from the group consisting of hydrocarbons, halogenated hydrocarbons, carbon dioxide, noble gases, anhydrous ammonia, and gaseous organic nitrogen compounds. The coolant is circulated through the closed conduit loop by means of a compressor having an inlet and an outlet, wherein the compressor inlet is in contact with the low pressure region and the compressor outlet is in contact with said high pressure region. The conduit includes at least one throttle on the upstream side of a distribution line through which the compressed coolant is permitted to expand and exert a cooling effect upon the soil surrounding the conduit in the region of the distribution line portion of the conduit. Following its expansion, the coolant is circulated through the loop owing to the influence of the compressor, which acts effectively as a pump and which also causes liquifecation of the coolant. At the high pressure outlet of the compressor is located a tank in which the liquified coolant is stored. A heat exchanger is preferably provided between the compressor outlet and the coolant storage tank in order to assist in the removal of excess heat generated by the compression of the gaseous coolant from the system. Finally, the system includes a root interfacing means located between the throttle and the inlet of the compressor. In its simplest form the root interfacing means comprises a straight length of conduit (a.k.a. "distribution line") which is uninsulated and is therefore able to absorb heat energy from the soil surrounding it, thus lowering the soil temperature to a desired level. It is the root interfacing means which directly influences the budding behavior of the flora.

In one embodiment of the invention, at least one distribution line is at least 3 inches beneath the surface of the soil. A distribution line may be routed in a non-linear path with respect to the ball of roots of the flora under consideration as viewed from directly above the ball of roots. The path may be circular or semi-circular.

BRIEF DESCRIPTION OF THE DRAWINGS

The drawing shows a schematic representation of the instant invention.

DETAILED DESCRIPTION INCLUDING A PREFERRED EMBODIMENT

Figure 1:
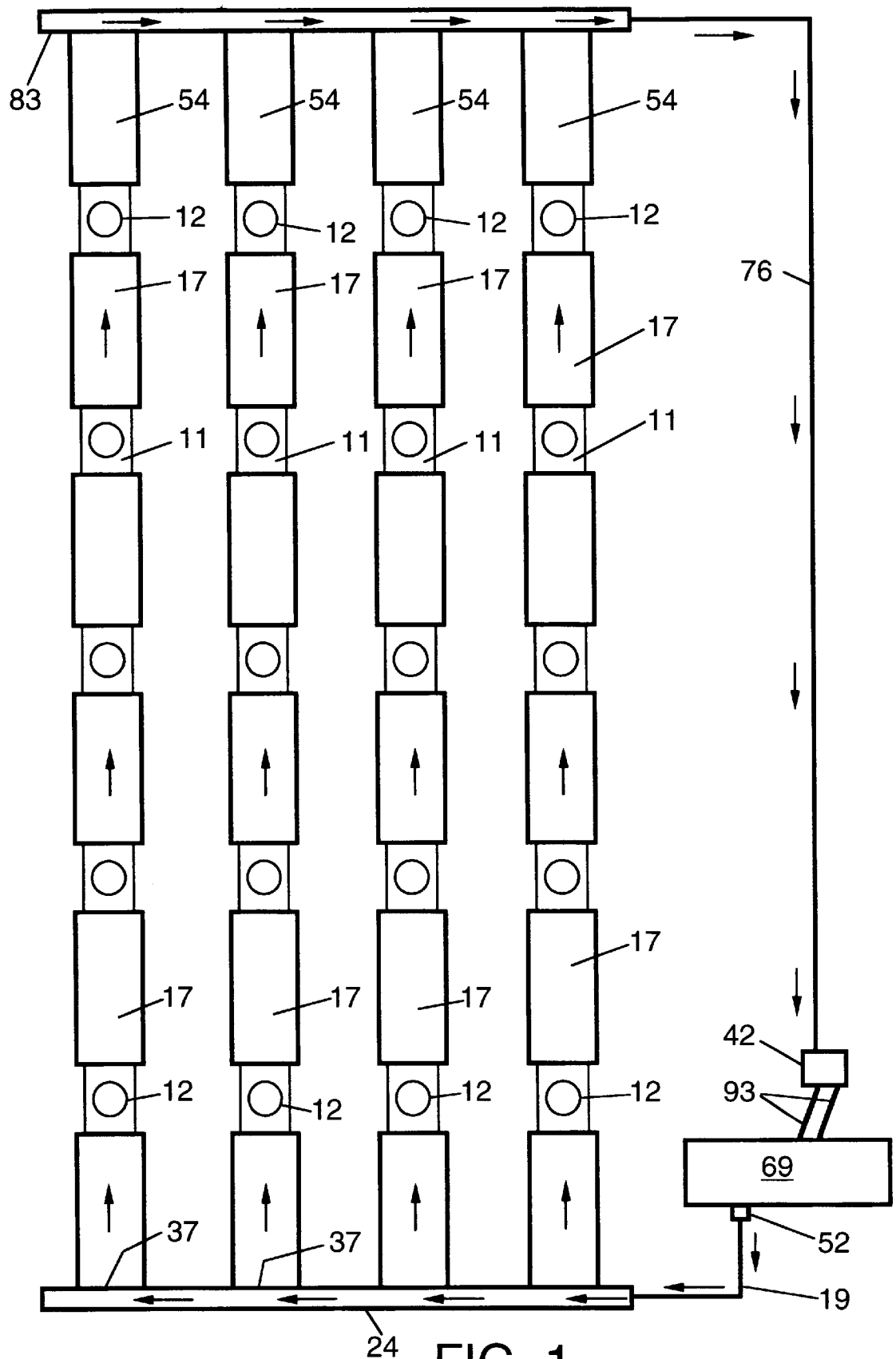
FIG. 1 shows a schematic representation of the instant invention.

The present invention comprises a system by which the temperature of the roots of plant life is influenced to such a degree that the production of flowering buds by the plant life is directly affected and effectively inhibited. It has been discovered that effective control over the budding behavior of various flora may be surprisingly achieved by controlling the temperature of only a portion of the total root mass of a given flora. Although various other workers have attempted to control budding in flowering plants, it has only now been unexpectedly discovered that only a small portion of the total root mass of a given flowering plant must be kept cool in order to influence the behavior of the plant as a whole. On its face, this implies that a signal sent as a result of a cold temperature sensed by the root mass is more dominant with respect to the plant's budding regulatory system than similar signals sent from the presence of a "warm" temperature. While the exact mechanism for the dormancy of plant life is not known at this time, the instant invention is anticipated as providing key information to theorists concerning further understanding of the budding process.

As used in this specification and the appended claims the word "flora" means any flowering plant life forms that produce edible fruit. This term includes trees including, but not limited to apple, pear, peach, plum, cherry, and mulberry. The term also includes such plants as grapes, strawberries, blueberries, and other berries, including all subspecies thereof. It is anticipated that the versatility of the instant invention is such that any fruit-bearing plant may be positively influenced and protected from frost or freezing damage encountered by swings in weather cycles including unseasonable warm spells during seasonal changes.

With the advent of modern meteorology, it is possible in most cases to have 24 hours advanced notice of the approach of unseasonably warm temperatures. To control the budding of various flora in accordance with the invention, one energizes the system at or before the onset of a warm spell. An effective amount of the root mass of the flora is maintained below the critical temperature for the particular species in question by virtue of the system's operation. By maintaining an effective amount of the root mass, typically only about one-third of the total root mass below the critical temperature, bud formation is suppressed indefinitely, until the operator of the system shuts the system down.

The timing of when the system may be shut down is dictated by several factors including the time during the season in which the warm spell occurs. Since the system of this invention is very economical to operate, it is preferable to operate the system continuously following warm spells that occur near the end of a winter, until the optimum date in the mind of the field operator or farmer is reached. This optimum date is dependent upon the number of days required for a given species to bring forth mature fruit, and the latitude at which the field is located. As an important option, the field operator may selectively cause the flora located on certain portions of the field to be delayed in their budding, even in the absence of warm spells, so as to confer the ability to stagger the ripening of the fruit to minimize losses normally associated by having the totality of one's crop reaching maturity all at the same time, a problem especially manifest to those with large orchards and vineyards.

Since the ground temperature is readily equilibrated to ambient conditions by natural entropic forces between about 12 and 24 hours following the shutdown of the system, the operator of the instant system is conferred with tremendous power over the timing of the maturing and harvest of his crop, which necessarily translates into significantly-increased yields that in many cases can make operation of the fields a viable option instead of fiscally impossible.

The instant invention comprises a closed loop conduit containing a coolant. The coolant is preferably gaseous under standard conditions of temperature and pressure, and preferably comprises anhydrous ammonia. Anhydrous ammonia is preferred since it has Joule-Thomson cooling characteristics especially well-suited for conditions normally encountered at farms and orchards which raise the flora to which this invention pertains. Joule-Thomson cooling is a well-known phenomena to those skilled in the chemical arts, and a detailed description thereof is set forth in the book entitled "Physical Chemistry", written by Peter W. Atkins, $3^{rd}$ ed. and published by W. H. Freeman and Company, New York, 1985 (ISBN-0-7167-1749-2), the entire contents of which are herein incorporated by reference thereto. Other gaseous coolants are herein anticipated as having utility in the instant invention, including all refrigerant gasses known to those of ordinary skill in the chemical arts, including the FREON® materials, as well as other chlorocarbons, fluorocarbons, chlorofluorocarbons, homohalocarbons or heterohalocarbons, and mixtures of any of the foregoing, provided that sufficient cooling is produced via circulation thereof for effectively controlling the budding behavior of the flora desired. Towards this end, any compressor used in accordance herewith must be fitted with seals and components compatible with the coolant selected, and such selection thereof is readily recognizable as being well within the skill of the ordinary artisan in the refrigeration field. Anhydrous ammonia is preferred also because it is readily available to most farmers, and any minor leaks in the system which may occur over time for various reasons are not detrimental to the environment insomuch as anhydrous ammonia is one of the most effective, flora-friendly fertilizer materials known to man. It is a benefit of the use of anhydrous ammonia that any leaks in the system may be readily detected by the thriving and outward appearance of other local flora, which is usually a deeper green than less-fertilized areas, or in extremely rare cases, a large leak may even cause death of the plant, which is readily observable. Additionally, as an optional feature, solenoid valves may be fitted to the conduit at appropriate locations in close proximity to the root masses influenced and may be used to controllably release some of the anhydrous ammonia contained in the cooling system, thus conferring a dual-function to the instant device—namely that of a fertilizer dispenser which applies ammonia directly to the soil surrounding the roots.

Various features of the drawing are referenced below. The closed-loop system of this invention is comprised generally of pipes which may comprise steel, plastic, or any other material from which pipes are normally constructed, provided that the pipe is capable of withstanding the pressure encountered during use of the system and is not attacked chemically by any of the materials being circulated through the system. The choice of such materials is well within the skill level of the ordinary artisan and a lubricant may or may not be contained within the conduit, the chemical composition and use of such lubricants being well known. The closed-loop system includes a high-pressure region and a low-pressure region. The high pressure region includes the tank 69 in which the liquified coolant is stored, as well as the piping 19 used to deliver the coolant to the high pressure manifold 24. To the high-pressure manifold is connected at least one, and preferably a plurality of, coolant distribution lines 54 each having an orifice or throttle 37 preferably within about 12 inches of the high pressure manifold through which the coolant is permitted to expand in order to provide Joule-Thomson cooling along the distribution lines.

Generally speaking, the root configuration of most flora contain a central spherical portion or "ball" of roots. A typical distribution line 54 of this invention is located within sufficient proximity to the ball of roots of a given flora so that once the compressor is energized, the cooling around the distribution line affects a portion of the spherical ball of roots and maintains said portion below the critical temperature. The distribution lines 54 most preferably pass through at least a portion of the spherical ball of roots. This is necessary since the majority of the cooling occurs, as intended, along the distribution lines by virtue of the location of the throttles between the high pressure manifold and each distribution line. It is preferred that about one-third of the ball of roots is affected by the reduced temperatures developed around the distribution line as a result of system energization.

In one form of the invention, the temperature on the exterior of at least one distribution line is below about 0 degrees Centigrade.

As depicted in FIG. 1 there are several root volumes 12 coincident with the distribution lines which are the location of the flora's ball of roots. Typically, to make the most effective use of the low temperatures generated in the distribution lines, insulated regions 17 are disposed along the distribution lines to prevent influx of heat along the distribution lines where no root mass is present, thus maximizing cooling efficiency and minimizing subterranean cooling where it is of no effect towards the object of this invention. The insulation may be any material known to have insulating properties useful in the refrigeration industry, including but not limited to fiberglass, cellulose, urea-formalin, and various foams. The distribution lines have regions containing no insulation 11 where root volumes 12 are coincident therewith. Following the exertion of its coolant affect on the distribution lines and hence the surrounding soil, anhydrous ammonia from the low pressure side of the closed-loop is collected at the low-pressure manifold 83 and is transmitted by means of a return line 76 to the inlet of the compressor 42, and is once again compressed into liquid form for storage in the insulated liquid storage tank 69, after preferably passing through heat exchanger 93 which serves to lower the temperature of the compressed coolant to below about 120 degrees F. Heat exchangers are well-known in the art, and the cooling system for the one employed in this capacity may include an ordinary FREON®-based air conditioning unit as the basis if the heat-removing means, although other cooling systems including brine-based systems are suitable. Preferably, the heat exchanger employs a liquid heat-transfer medium, such as oil or other suitable liquids, as the use of such are well-known in the art.

During continuous operation of this invention a radial temperature gradient is generated with respect to the centerline of a given distribution line. The following discussion relates to the use of the preferred coolant, anhydrous ammonia, although the optimal conditions for the use of other coolant media may be readily determinable by those of ordinary skill in the art of physical chemistry.

It has been found that when the total length of the distribution line is two hundred fifty (250) feet and the diameter of the distribution line is one-half inch buried to a depth of 5 inches, the preferred rate of flow of ammonia through the distribution line is 35 pounds per hour, and the preferred pressure in the distribution line is between 28 and 38 p.s.i., with 33 p.s.i. being most preferred. Under these conditions, which are preferable for apple orchards, when the ambient air temperature is between about 50 and 110 degrees F, the temperature of the ground 8 inches away from the distribution line is effectively cooled and is seen to be maintained to between 38 degrees Fahrenheit to 42 degrees Fahrenheit. Within 4 inches of the distribution line, the temperature is observed to be maintained at between 23 and 31 degrees F.

Preferably, the depth at which the distribution lines are located is at least about 4 inches, more preferably between about 5 and 8 inches, with 6 inches being most preferable for all distribution line depths. The diameter of the distribution lines is not critical, as any diameter may be suitable, provided that the operating parameters employed cause sufficient cooling to lower the temperature of the ground within 4 inches of the distribution line to a temperature below the critical temperature for the plant in question, which is usually below the freezing point of water. The pressure inside the distribution lines (low-pressure side) may be between about 28 and 38 p.s.i., and is preferably 33 psi., but in no case less than 12 p.s.i. when anhydrous ammonia is employed as the coolant. The pressure of the high-pressure side may be between about 150 and 250 p.s.i., and is preferably 200 p.s.i. when anhydrous ammonia is employed as the coolant. The rate at which the coolant is pumped through a distribution line may be between about eleven (11) pounds per hour and forty (40) pounds per hour, and is preferably thirty-five (35) pounds per hour when the diameter of the distribution line is one-half(½) inch and the total distribution line length is 250 feet. Preferably, the pressure in the distribution lines in no event shall exceed 50 p.s.i. when anhydrous ammonia is used as the coolant medium.

The diameter of the orifice or throttle through which the compressed coolant medium is permitted to expand varies with the length of the distribution line employed. In the case of the 250-foot long distribution line discussed above it is preferable to employ two throttles, each having a diameter of ¹⁄₆₄ of an inch, and locate them preferably on a common plane at the beginning of each distribution line wherein the plane is perpendicular to the linear dimension of the pipe. In the case of shorter distribution lines, smaller orifice diameters may be employed. Throttle diameters between $1/128$ inches and $1/16$ inches are herein indicated as having utility in this invention, however, more commonly the preferred orifice diameter will lie between about $1/64$ and $1/32$ inches in diameter. The preferred size of the orifice, the volume of coolant pumped, and the pressure employed are all variables which are readily determinable by one of ordinary skill, however, in no event should the pressure in the distribution line be permitted to exceed 50 p.s.i. in the case when anhydrous ammonia is employed as the coolant medium. Preferably, the amount of anhydrous ammonia pumped through the system is between about 0.10 pounds per hour and 0.20 pounds per hour per foot of distribution line.

As far as installation of the distribution lines is concerned, in the case of new orchards, vineyards, and the like trenches may be dug and the distribution laid in the trenches in close proximity to where the roots of the flora shall reside. In the case of existing orchards, vineyards, and the like, a trench may be dug parallel to the rows of existing flora, and the distribution lines laid in. The only caveat is that care is taken not to damage major root arteries. It is preferable to run two lines through each ball of roots—one on each side of the stem or trunk of the flora a distance from the stem or trunk equal to about one fourth the diameter of the ball of roots.

Mention has been made of the concept of a critical temperature which is presumed to vary from species to species. Since several factors are believed to be at work with respect to the phenomenon of budding in fruit-bearing flora, it is sufficient for this invention to say that the critical temperature for root masses of this invention are the freezing point of water, since when root masses are maintained below this temperature, budding is not seen.

A factor which may be monitored by which the budding of flora is directly related is the amount of sap flowing through the trunk or base of the flora. For purposes of this invention, the base includes the first 24 inches of the flora which protrudes outward from the base of roots at the air/soil interface. Various means for measuring sap flow are known in the art, including those set forth in U.S. Pat. Nos. 5,481,090; 5,423,211; 5,367,905; 5,337,604; 5,269,183; and 4,745,805, the entire contents of all of which are incorporated herein by reference. Particularly, the '183 patent and the '805 patent are especially useful insomuch as they are capable of providing an electrical signal relating to the sap flow to a microprocessor. The microprocessor, in turn, may be connected to a relay, solenoid, or other switching device, including solid-state switching devices, which controls the compressor used in this invention for pumping the coolant through the distribution lines. The microprocessor can be set so that whenever the sap in a given flora begins to flow, the compressor is turned on so as to cool the root systems until the flow of sap stops. Through use of such electronic controls, the system may be operated in an automatic mode.

Figure 2:
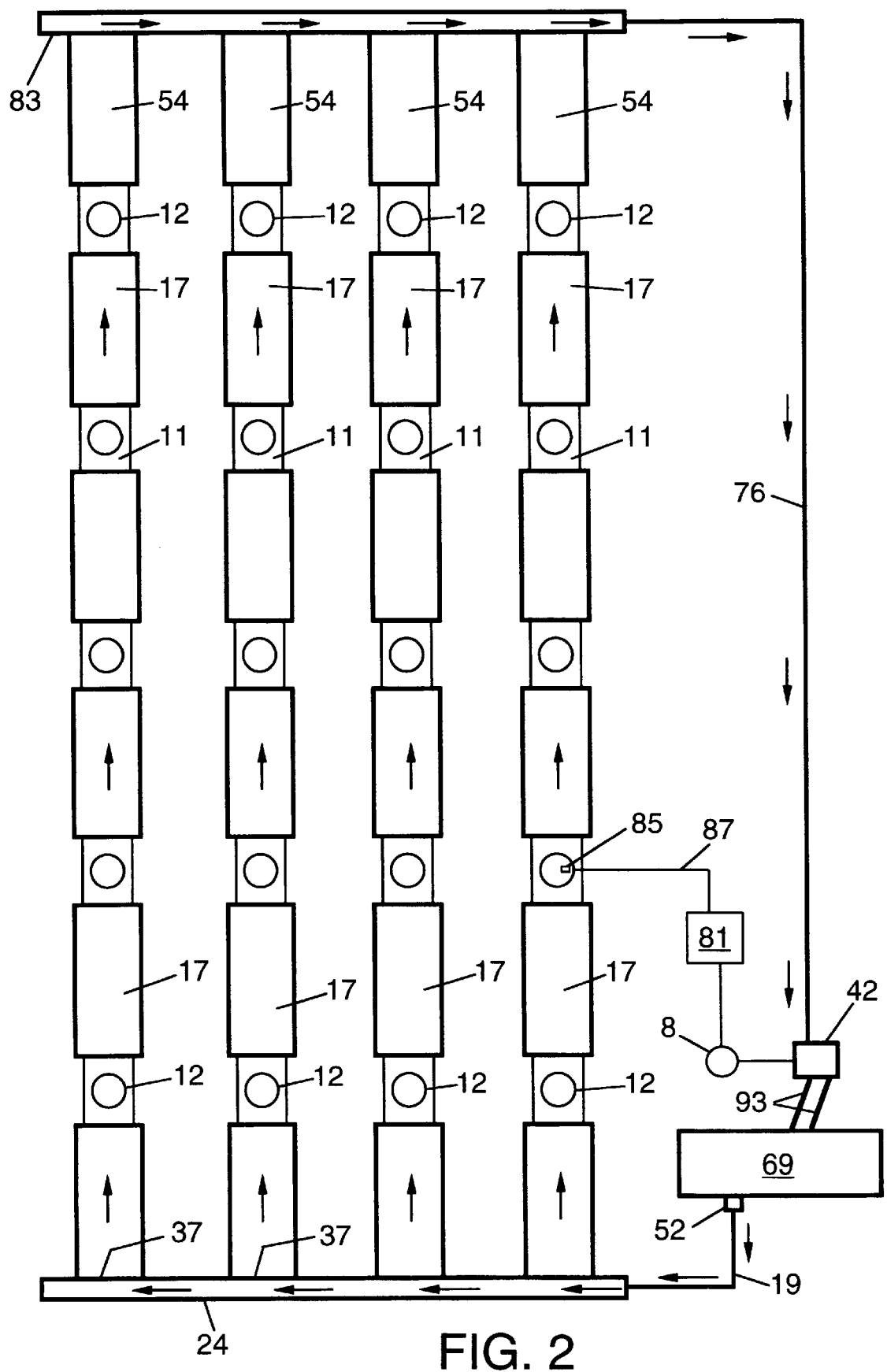
FIG. 2 shows a schematic representation of an alternate embodiment of the instant invention.

An alternate embodiment of the invention shown in FIG. 2 includes the use of a means for sensing the flow of sap 85 in the flora under consideration, which means is connected to a microprocessor 81 via connective means 87. The microprocessor in turn is connected to a solenoid 8, which solenoid 8 is in turn connected to the compressor 42.

Consideration must be given to the fact that although this invention has been shown and described with respect to certain preferred embodiments, it is obvious that equivalent alterations and modifications will occur to others skilled in the art upon the reading and understanding of this specification and the claims appended hereto. The present invention includes all such equivalent alterations and modifications, and is limited only by the scope of the claims which follow.

I claim:

1. A method for inhibiting bud formation on agriculturally-valuable flora which comprises the step of:
    pumping a coolant through at least one distribution line of a system which comprises:
    a) a coolant-bearing subterranean closed-loop conduit having a high-pressure region containing said coolant in the liquid state and a low-pressure region containing said coolant in the gaseous state;
    b) a compressor having an inlet and an outlet wherein said inlet is in contact with said low-pressure region and said outlet is in contact with said high-pressure region;
    c) a tank for storage of said liquid coolant;
    d) at least one distribution line located between said outlet and said inlet of said compressor; and
    e) at least one throttle having a diameter between about $1/128^{th}$ and $1/32^{nd}$ of an inch located within said distribution line through which said coolant expands as it passes from said high-pressure region to said low-pressure region
    prior to formation of buds on said flora.

2. A method for staggering the harvest times of various portions of fruit crops on orchards and farms which comprises selective application of the method described in claim 1 to only portions of the total crop contemplated.

3. A system for controlling the temperature of the roots of agriculturally valuable flora which comprises:
    a) a coolant-bearing subterranean closed-loop conduit having a high-pressure region containing said coolant in the liquid state and a low-pressure region containing said coolant in the gaseous state;
    b) a compressor having an inlet and an outlet, wherein said inlet is in contact with said low-pressure region and said outlet is in contact with said high-pressure region;
    c) a tank for storage of said liquid coolant;
    d) at least one distribution line located between said outlet and said inlet of said compressor;
    e) at least one throttle having a diameter between about $1/128^{th}$ and $1/32^{nd}$ of an inch located within said distribution line through which said coolant expands as it passes from said high-pressure region to said low-pressure region;
    f) a means for sensing the flow of sap in the trunk of an agriculturally-valuable flora;
    g) a microprocessor connected to said sensing means; and
    h) a solenoid connected to said microprocessor and said compressor.

4. A system for controlling the temperature of the roots of agriculturally valuable flora which comprises:

a) a coolant-bearing subterranean closed-loop conduit having a high-pressure region containing said coolant in the liquid state and a low-pressure region containing said coolant in the gaseous state, b) a compressor having an inlet and an outlet, wherein said inlet is in contact with said low-pressure region and said outlet is in contact with said high-pressure region;

c) a tank for storage of said liquid coolant;

d) at least one distribution line located between said outlet and said inlet of said compressor, e) at least one throttle having a diameter between about $1/128^{th}$ and $1/32^{nd}$ of an inch located within said distribution line through which said coolant expands as it passes from said high-pressure region to said low-pressure region; and f) roots of an agriculturally valuable flora in contact with said distribution line.

5. The system of claim 4 wherein said coolant is a gas having an inversion temperature greater than 50 degrees Centigrade.

6. The system of claim 4 wherein said coolant is selected from the group consisting of: hydrocarbons, halogenated hydrocarbons, carbon dioxide, noble gases, anhydrous ammonia, and gaseous organic nitrogen compounds.

7. The system of claim 4 wherein said heat exchanger causes coolant emerging from said compressor to be cooled to below 120 degrees Fahrenheit.

8. The system according to claim 4 wherein at least one distribution line is within 36 inches of the center of the ball of roots of an agriculturally-valuable flora.

9. The system of claim 8 wherein said compressor is pumping said coolant through at least one distribution line at a rate of between about 0.10 pounds per hour and 0.20 pounds per hour per linear foot of length of distribution line.

10. The system according to claim 9 wherein the temperature on the exterior of at least one distribution line is below about 0 degrees Centigrade.

11. The system according to claim 10 wherein the distribution line passes through an amount of roots between about $1/6^{th}$ and $1/2$ of the total roots of the flora.

12. The system according to claim 10 wherein the distribution line passes through an amount of roots between about $1/6^{th}$ and $1/2$ of the total roots of the ball of roots of the flora.

13. The system of claim 9 wherein said sufficient amount of roots are maintained at a temperature below forty (40) degrees Fahrenheit.

14. The system according to claim 4 wherein at least one distribution line is at least 3 inches beneath the surface of the soil.

15. The system according to claim 14 wherein at least one distribution line is at least five inches beneath the surface of the soil.

16. The system of claim 4 wherein a plurality of distribution lines traverse a single ball of roots.

17. The system of claim 4 wherein said distribution line is routed in a non-linear path with respect to the ball of roots of said flora as viewed from directly above said ball of roots, said path being selected from the group consisting of: a circular path or semicircular path.

* * * * *